US012638405B2

(12) United States Patent
     Safai

(10) Patent No.: US 12,638,405 B2
(45) Date of Patent: May 26, 2026

(54) X-RAY LINE SCAN FOR FOREIGN OBJECT DEBRIS DETECTION

(71) Applicant: The Boeing Company, Arlington, VA (US)

(72) Inventor: Morteza Safai, Newcastle, WA (US)

(73) Assignee: THE BOEING COMPANY, Arlington, VA (US)

( * ) Notice: Subject to any disclaimer, the term of this patent is extended or adjusted under 35 U.S.C. 154(b) by 332 days.

(21) Appl. No.: 18/182,975

(22) Filed: Mar. 13, 2023

(65) Prior Publication Data

US 2024/0310306 A1      Sep. 19, 2024

(51) Int. Cl.
     G01N 23/18       (2018.01)
     G01N 23/04       (2018.01)
     G01N 23/083      (2018.01)

(52) U.S. Cl.
     CPC ............ G01N 23/18 (2013.01); G01N 23/04 (2013.01); G01N 23/083 (2013.01); *G01N 2223/20* (2013.01); *G01N 2223/33* (2013.01)

(58) Field of Classification Search
     CPC ...... G01N 23/04; G01N 23/083; G01N 23/18; G01N 2223/20; G01N 2223/33
     See application file for complete search history.

(56) References Cited

U.S. PATENT DOCUMENTS

| | | | | | |
|---|---|---|---|---|---|
| 5,033,073 | A | * | 7/1991 | Friddell | G01N 23/203 |
| | | | | | 378/146 |
| 5,237,598 | A | * | 8/1993 | Albert | H04N 13/254 |
| | | | | | 378/146 |
| 5,583,904 | A | * | 12/1996 | Adams | G01N 23/044 |
| | | | | | 378/57 |

(Continued)

FOREIGN PATENT DOCUMENTS

| | | | | |
|---|---|---|---|---|
| CN | 112098441 | A | * 12/2020 | ............ G01N 23/04 |
| EP | 3614131 | A1 | 2/2020 | |
| GB | 2519692 | A | 4/2015 | |

OTHER PUBLICATIONS

Gilow, Christoph (EP Examiner), Extended European Search Report issued Aug. 2, 2024 in corresponding EP Application No. 24159612.1, 7 pages.

*Primary Examiner* — Blake C Riddick

(74) *Attorney, Agent, or Firm* — MH2 Technology Law Group LLP

(57)                    ABSTRACT

A system for radiographic inspection includes a line source that emits a fan shaped beam of x-rays and a linear x-ray detector that detects the fan shaped beam of x-rays. The system further includes a first movable platform that positions the line source to emit the fan shaped beam of x-rays towards the linear x-ray detector. A second movable platform positions the linear x-ray detector to detect the fan shaped beam of x-rays after transmission through the structure or component being inspected. Synchronized movement of the first movable platform and the second movable platform significantly reduces the time of inspection while the fan shaped beam of x-rays minimizes health risks. The system further includes a first filter that blocks x-rays below a first energy threshold, and a second filter that blocks x-rays below a second energy threshold. The filters provide the system the ability to inspect structures and components formed of multiple types of materials, for example, foreign object debris.

20 Claims, 5 Drawing Sheets

(56)　　　　References Cited

U.S. PATENT DOCUMENTS

| 5,638,420 A * | 6/1997 | Armistead | G01V 5/281 |
| | | | 378/146 |
| 5,648,619 A * | 7/1997 | Gustafsson | G01N 23/083 |
| | | | 73/865.8 |
| 5,740,224 A * | 4/1998 | Muller | G01N 23/044 |
| | | | 378/11 |
| 5,864,146 A * | 1/1999 | Karellas | A61B 6/502 |
| | | | 378/191 |
| 5,984,023 A * | 11/1999 | Sharma | E21B 47/11 |
| | | | 175/58 |
| 6,111,929 A * | 8/2000 | Hazlett | G01N 23/223 |
| | | | 378/45 |
| 6,380,540 B1 * | 4/2002 | Maor | G01T 1/2985 |
| | | | 250/363.04 |
| 6,662,088 B1 * | 12/2003 | Hopple | G01N 23/04 |
| | | | 901/44 |
| 7,957,505 B1 * | 6/2011 | Katz | G01V 5/281 |
| | | | 378/57 |
| 9,036,781 B1 * | 5/2015 | Safai | G01N 23/00 |
| | | | 378/86 |
| 2002/0080913 A1 * | 6/2002 | Roder | G01N 23/044 |
| | | | 378/57 |
| 2002/0181653 A1 * | 12/2002 | Birdwell | G01N 23/04 |
| | | | 378/58 |
| 2003/0016790 A1 * | 1/2003 | Grodzins | G01V 5/222 |
| | | | 378/147 |
| 2003/0043964 A1 | 3/2003 | Sorenson | |
| 2003/0091145 A1 * | 5/2003 | Mohr | G01N 23/04 |
| | | | 378/58 |
| 2003/0147493 A1 * | 8/2003 | Bueno | G01N 23/04 |
| | | | 378/57 |
| 2004/0017888 A1 * | 1/2004 | Seppi | G01N 23/04 |
| | | | 378/57 |
| 2004/0234031 A1 * | 11/2004 | Francke | A61B 6/4035 |
| | | | 378/98 |
| 2004/0247075 A1 * | 12/2004 | Johnson | G01V 5/22 |
| | | | 378/57 |
| 2006/0055400 A1 * | 3/2006 | Safai | G01N 23/04 |
| | | | 324/232 |
| 2006/0056585 A1 * | 3/2006 | Georgeson | G01N 23/083 |
| | | | 378/57 |
| 2006/0133561 A1 * | 6/2006 | Droin | G03C 1/0051 |
| | | | 378/2 |
| 2006/0198498 A1 | 9/2006 | Birdwell et al. | |
| 2007/0223657 A1 * | 9/2007 | Birdwell | G01N 23/04 |
| | | | 378/205 |
| 2007/0291896 A1 * | 12/2007 | Parham | A61B 6/583 |
| | | | 378/53 |
| 2008/0075227 A1 * | 3/2008 | Christoph | A61B 6/584 |
| | | | 250/252.1 |
| 2008/0170655 A1 * | 7/2008 | Bendahan | G01V 5/226 |
| | | | 378/9 |
| 2008/0298545 A1 * | 12/2008 | Bueno | G01V 5/224 |
| | | | 378/57 |
| 2008/0298546 A1 * | 12/2008 | Bueno | G01V 5/222 |
| | | | 250/359.1 |
| 2009/0067575 A1 * | 3/2009 | Seppi | G01V 5/226 |
| | | | 378/57 |
| 2009/0225944 A1 * | 9/2009 | Lee | G01N 23/2076 |
| | | | 378/71 |
| 2009/0278050 A1 * | 11/2009 | McNabb, Jr. | G01N 23/083 |
| | | | 250/370.06 |
| 2010/0034353 A1 * | 2/2010 | Kravis | G01V 5/222 |
| | | | 378/87 |
| 2011/0058646 A1 * | 3/2011 | Herranz | G01N 23/04 |
| | | | 250/361 R |
| 2011/0103548 A1 * | 5/2011 | Bendahan | G01N 23/203 |
| | | | 378/57 |
| 2011/0170661 A1 * | 7/2011 | Bueno | G01V 5/20 |
| | | | 378/57 |
| 2011/0206179 A1 * | 8/2011 | Bendahan | G01V 5/22 |
| | | | 378/19 |
| 2011/0274242 A1 * | 11/2011 | Linev | G01V 5/223 |
| | | | 378/57 |
| 2013/0079918 A1 * | 3/2013 | Spencer | G01N 23/223 |
| | | | 700/223 |
| 2013/0101090 A1 * | 4/2013 | Schubert | G01N 23/203 |
| | | | 378/86 |
| 2013/0287169 A1 * | 10/2013 | Liesenfelt | G21K 1/04 |
| | | | 378/57 |
| 2014/0226789 A1 * | 8/2014 | Bendahan | G01N 23/203 |
| | | | 378/86 |
| 2015/0325010 A1 * | 11/2015 | Bedford | G01V 5/22 |
| | | | 378/57 |
| 2016/0258884 A1 * | 9/2016 | Kang | G01N 23/04 |
| 2017/0010383 A1 * | 1/2017 | Mircea | G01V 5/226 |
| 2017/0238887 A1 * | 8/2017 | Karim | G01T 1/24 |
| 2017/0299526 A1 * | 10/2017 | Morton | G21K 1/043 |
| 2017/0356849 A1 * | 12/2017 | Henderkott | G01N 21/643 |
| 2018/0017702 A1 * | 1/2018 | Bendahan | G01V 5/224 |
| 2019/0011254 A1 * | 1/2019 | Nielsen | B29C 51/14 |
| 2019/0079201 A1 * | 3/2019 | Street | G01T 1/24 |
| 2019/0094407 A1 * | 3/2019 | Zhang | G01N 23/046 |
| 2019/0213759 A1 * | 7/2019 | Lee | G01T 1/247 |
| 2019/0353802 A1 * | 11/2019 | Steinhauser | G01T 1/20181 |
| 2020/0158664 A1 * | 5/2020 | Jespersen | G01B 11/24 |
| 2020/0200713 A1 * | 6/2020 | Hafenrichter | G01N 29/225 |
| 2020/0254494 A1 * | 8/2020 | Bolton | B23K 26/032 |
| 2021/0041582 A1 * | 2/2021 | Simon | G01T 1/2018 |
| 2021/0121142 A1 * | 4/2021 | Kawata | G01T 7/005 |
| 2021/0305005 A1 * | 9/2021 | Safai | G01N 23/203 |
| 2022/0252740 A1 * | 8/2022 | Bosset | A61B 6/4233 |
| 2022/0381705 A1 * | 12/2022 | Makeev | G01N 23/046 |
| 2023/0042741 A1 * | 2/2023 | Rohling | G01N 29/2406 |
| 2023/0049542 A1 | 2/2023 | Musgrave | |
| 2024/0065645 A1 * | 2/2024 | Hattori | A61B 6/4208 |
| 2024/0142658 A1 * | 5/2024 | Chen | G01V 5/226 |
| 2024/0310304 A1 * | 9/2024 | Chen | G01V 5/232 |
| 2024/0310305 A1 * | 9/2024 | Chen | G01N 23/10 |
| 2024/0377553 A1 * | 11/2024 | Chen | G01V 5/226 |
| 2024/0410838 A1 * | 12/2024 | Chen | G01V 5/232 |

* cited by examiner

300

SECOND MOVEABLE PLATFORM
326

LINEAR DETECTOR
322

X-RAY DETECTION

POSITION SENSOR
332

CONTROLLER
360

COMPUTER
350

DISPLAY
370

ENCODER
340

POSITION SENSOR
330

X-RAY GENERATION

LINE SOURCE
312

FIRST MOVEABLE PLATFORM
316

400

EMITTING A BEAM OF X-RAYS FROM A LINE SOURCE TOWARDS A STRUCTURE BEING INSPECTED — 410

DETECTING THE BEAM OF X-RAYS AT A LINEAR DETECTOR — 420

SYNCHRONOUSLY MOVING X-RAY LINE SOURCE AND LINEAR DETECTOR — 430

DISPLAYING AN IMAGE OF THE OBJECT BEING INSPECTED — 440

X-RAY LINE SCAN FOR FOREIGN OBJECT DEBRIS DETECTION

FIELD OF DISCLOSURE

The present disclosure relates to systems and methods for nondestructive inspection (NDI) of structures and components. More particularly, the present disclosure relates to systems and methods for radiographic inspection of structures and components that detect foreign object debris.

BACKGROUND OF THE INVENTION

Radiography is a commonly used nondestructive inspection (NDI) technique to detect defects in structures and components. Current digital radiography inspection systems, however, are costly and time consuming. For example, digital radiography is routinely used to inspect aircraft for defects such as cracks or corrosion. Current digital radiography inspection systems use a large x-ray source and digital detector arrays that require constant alignment of the beam of x-rays. For a large structure such as an aircraft, inspection of the wings and fuselage can last for two or more days and generate large amounts of data that must be assessed. And, due to the large amount of x-rays generated and the health hazard that could be posed by exposure thereto, the entire area near the aircraft must be cleared of people during the two or more days required for inspection thereby precluding any contemporaneous activity such as repair or other types of inspection. Current digital radiography inspection systems used to inspect aircraft also cannot accurately detect foreign object debris (FOD) due to their inability to discriminate between the atomic number of materials. FOD includes objects left on or within an aircraft after completion of assembly. Examples include, but are not limited to, tools, metal shavings, plastic pieces, drill bits, gloves, and rags. For aircraft in use, FOD on a runway, for example, can be run over and strike the aircraft and cause damage. For example, tools, screws, or other objects, left on the runway can be run over by the aircraft or other vehicles and strike the wing or fuselage causing damage. As a result, improved x-ray systems and methods for nondestructive inspection are desired.

SUMMARY OF THE INVENTION

According to the present disclosure, a system for transmission radiographic inspection is provided. The system for transmission radiographic inspection includes a first movable platform and a line source coupled to the first movable platform, wherein the line source emits a fan shaped beam of x-rays. The system for transmission radiographic inspection further includes a second movable platform, a linear x-ray detector coupled to the second movable platform, wherein the linear x-ray detector is positioned to detect the fan shaped beam of x-rays, and a position sensor and an encoder to synchronize movement of the first movable platform and second movable platform.

According to the present disclosure, another system for transmission radiographic inspection is provided. The system for radiographic inspection includes a line source that emits a beam of x-rays, a first linear x-ray detector, a second linear x-ray detector positioned over the first linear x-ray detector, and a first filter positioned between the first linear x-ray detector and the second linear x-ray detector, wherein the first filter blocks x-rays below a first energy threshold level. The system for transmission radiographic inspection also includes a third linear x-ray detector positioned over the second linear x-ray detector and a second filter positioned between the second linear x-ray detector and the third linear x-ray detector, wherein the second filter blocks x-rays below a second energy threshold level. The system for transmission radiographic inspection further includes a first movable mount that positions the line source to emit the beam of x-rays towards the first, second, and third linear x-ray detectors, a second movable mount that positions the first, second, and third linear x-ray detectors to detect the beam of x-rays, and a position sensor and an encoder to synchronize movement of the line source and first, second, and third linear x-ray detectors along or around an axis.

According to the present disclosure a method for inspecting a structure is provided. The method includes emitting a beam of x-rays from a line source towards a structure being inspected, wherein the beam of x-rays comprise a fan shape, detecting the beam of x-rays by a linear x-ray detector subsequent to the beam of x-rays passing through the structure being inspected, and moving, synchronously, the line source and the linear x-ray detector along the structure being inspected during the emitting the x-ray beam and detecting the x-rays, and displaying a real-time, two-dimensional image of a portion of the structure being inspected.

According to the present disclosure another method for inspecting a structure is provided. The method includes emitting a beam of x-rays from a line source towards a structure being inspected, wherein the beam of x-rays comprise a fan shape, detecting the beam of x-rays by a multi-energy linear x-ray detector that includes multiple linear x-ray detectors stacked on top of each other and separated by one or more filters that block x-rays below a certain energy threshold subsequent to the beam of x-rays passing through the structure being inspected, and moving, synchronously, the line source and the linear x-ray detector along the structure being inspected during the emitting the x-ray beam and detecting the x-rays.

BRIEF DESCRIPTION OF DRAWINGS

The accompanying drawings, which are incorporated in and constitute a part of this specification, illustrate aspects of the present teachings and together with the description, serve to explain the principles of the present teachings.

DETAILED DESCRIPTION OF THE INVENTION

Figure 1:
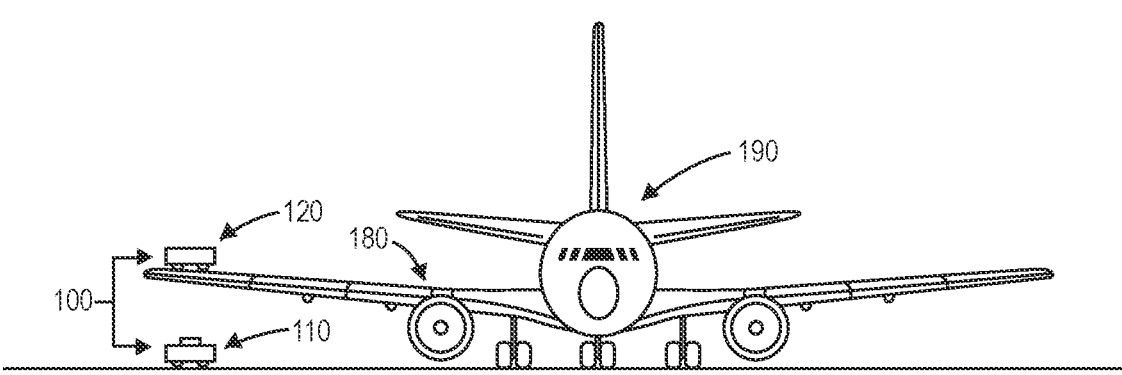
FIG. 1 schematically illustrates a system for radiographic inspection of a structure, according to an implementation.

Reference will now be made in detail to the present teachings, examples of which are illustrated in the accompanying drawings. In the drawings, like reference numerals have been used throughout to designate identical elements. In the following description, reference is made to the accompanying drawings that form a part thereof, and in which is shown, by way of non-limiting illustration, specific examples of practicing the present teachings. The following description is, therefore, merely exemplary.

The present disclosure is directed to systems and methods for radiographic inspection of structures and components. The system includes a line source that emits a fan shaped beam of x-rays and a linear x-ray detector that detects the fan shaped beam of x-rays. As used herein, a fan shaped beam of x-rays refers to essentially a two-dimensional beam of x-rays that diverge as the beam radiates away from a line source of x-rays. Because the line source and linear x-ray detector isolate the x-rays to a two-dimensional fan shape, a reduced amount of x-rays can be used for inspection compared to conventional systems. As a result, the need to evacuate the inspection area to minimize health risks is avoided. The system further includes a first movable platform that positions the line source to emit the fan shaped beam of x-rays towards the linear x-ray detector. A second movable platform position the linear x-ray detector to detect the fan shaped beam of x-rays after transmission through the structure or component being inspected. By synchronizing movement of the first movable platform and second movable platform to scan the structure or component with the fan shaped beam of x-rays, inspection can be completed in a fraction of the time compared to conventional radiographic systems and methods. The system can further include a first filter that blocks x-rays below a first energy threshold, and a second filter that blocks x-rays below a second energy threshold. The filters provide the system the ability to inspect structures and components formed of multiple types of materials with different atomic numbers including metals, composites, and plastics, to detect FOD on or within the structure being inspected, as well as to detect defects or damage.

FIG. 1 shows a radiographic inspection system 100 according to the present disclosure. Radiographic inspection system 100 includes an x-ray generation portion 110 and an x-ray detection portion 120. FIG. 1 further depicts a wing 180 of an aircraft 190 as an exemplary structure to be inspected. Although depicted as an aircraft, one of ordinary skill in the art will understand that use of radiography inspection system is not limited to aircraft and aircraft components. X-ray generation portion 110 of radiographic inspection system 100 provides a beam of x-rays directed towards wing 180. In various aspects, the beam of x-rays can be linear in shape and have a two-dimensional fan or triangular shape. X-ray detection portion 120 of radiographic inspection system 100 detects the beam of x-rays after transmission through wing 180. Nondestructive inspection of wing 180 can be accomplished by synchronously moving, also referred to herein as scanning, x-ray generation portion 110 and x-ray detection portion 120 along a length and/or width of wing 180 as x-rays generated by x-ray generation portion 110 are detected by x-ray detection portion 120 after transmission of the linear fan shaped x-rays through wing 180.

Figure 2A:
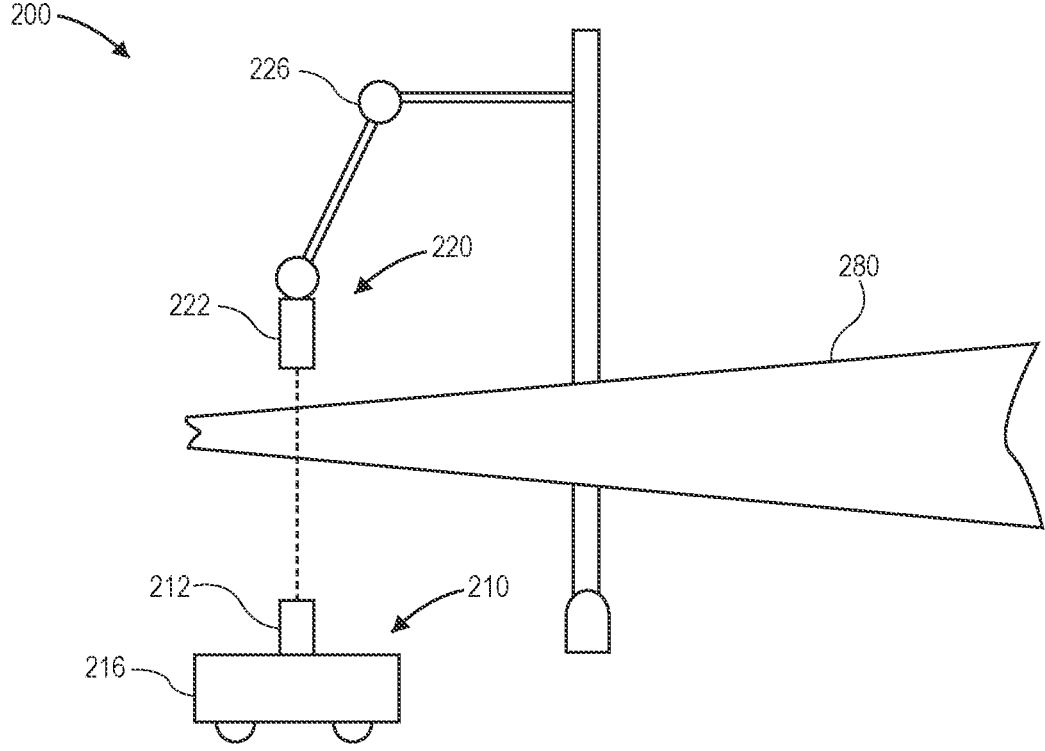
FIG. 2A schematically illustrates a system for radiographic inspection with synchronous movement of the x-ray line source and linear detector array along an axis, according to an implementation.

FIG. 2A provides further details of x-ray generation portion and x-ray detection portion of a radiographic inspection system 200 according to the present disclosure. An x-ray generation portion 210 includes a line source 212 and a first movable platform 216.

Line source 212 includes an x-ray tube and a linear aperture positioned to provide a linear, diverging beam of x-rays. Use of line source 212 minimizes the amount of x-rays that stray from the inspection area and reduces the health hazard to personnel in the vicinity of system 200. The x-ray tube can be glass or ceramic and have power ranging from about 100 to about 4000 watts and voltages ranging from about 30 to about 450 kV. Suitable x-ray tubes are manufactured by, for example, Phillips (Amsterdam, Netherlands), Varian (Palo Alto, CA), and General Electric (Boston, MA). Line source 212 can further include a cooling system, for example, circulating water or closed cycle cooling to control the temperature of the x-ray tube. The linear aperture can be positioned adjacent to the x-ray tube and serve to block x-rays. X-rays not blocked by the linear aperture form the linear, diverging (e.g., fan shaped) beam of x-rays that can be used for inspection. The linear aperture can be formed of any material that blocks x-rays, including but not limited to lead, steel, and tungsten.

Line source 212 is coupled to first movable platform 216. First movable platform 216 positions line source 212 to emit the fan shaped beam of x-rays towards a structure to be inspected, depicted in FIG. 2A as a wing 280 of an aircraft. First movable platform 216 further allows movement of x-ray generation portion 210. Although FIG. 2A depicts first movable platform 216 with wheels that roll along the ground under wing 280, other movable platforms are envisioned including, but not limited to, a robotic arm, a conveyor belt, a track, a drone, an all wheel crawler, holonic wheels and suction cup wheels.

X-ray detection portion 220 includes an x-ray detector 222 and a second movable platform 226. X-ray detector 222 can be, for example, a linear x-ray detector array having a one-dimensional x-ray detector with at least one row of x-ray sensitive detectors. The x-ray sensitive detectors can be, for example, a silicon (Si) or complementary metal-oxide-semiconductor (CMOS) based detector with scintillating materials on top. Scintillating materials can be, for example, CsI:Na, $Gd_2O_2S$, or $CaWO_4$, to convert x-rays to visible light.

Figure 2B:
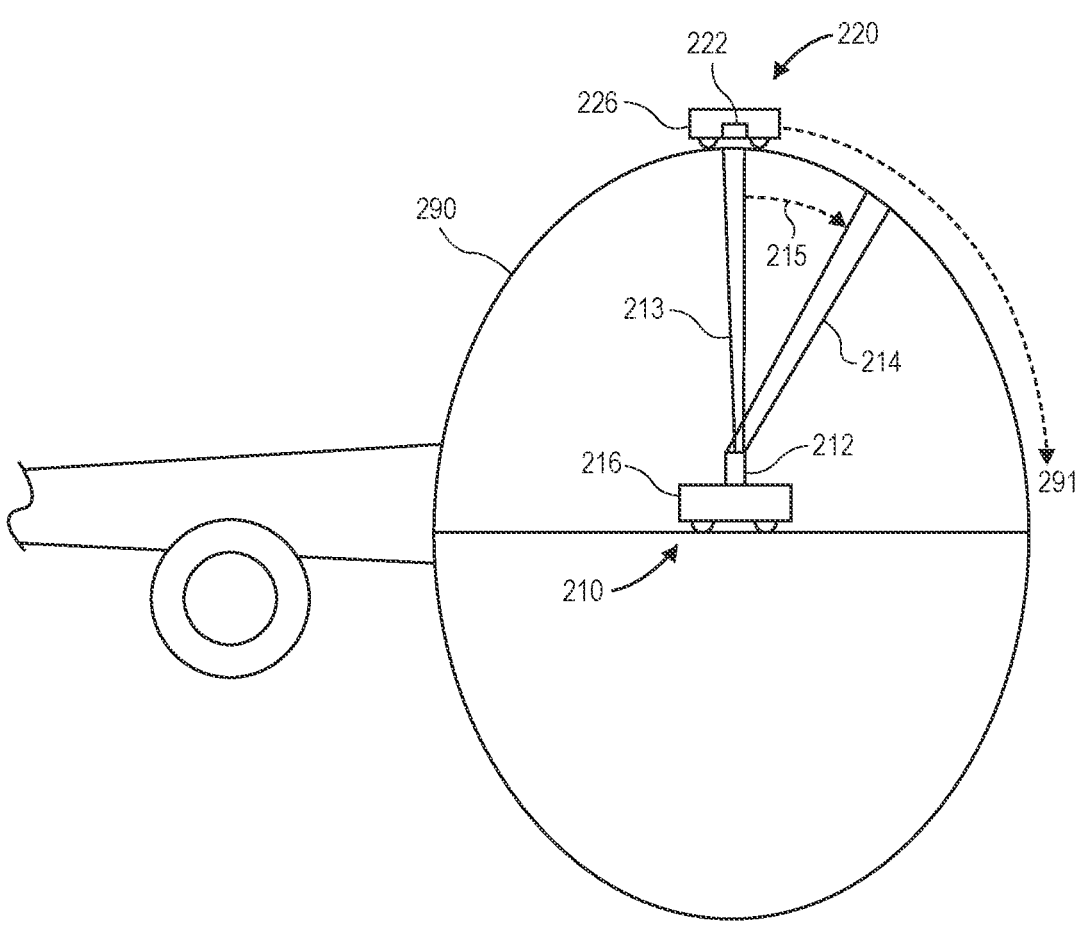
FIG. 2B schematically illustrates a system for radiographic inspection with synchronous movement of the x-ray line source and linear detector array around an axis, according to an implementation.

X-ray detector 222 is coupled to second movable platform 226. Second movable platform 226 positions x-ray detector 222 to detect the fan shaped beam of x-rays after transmission through a structure to be inspected, depicted in FIG. 2A as a wing 280 of an aircraft. Second movable platform 226 further allows synchronous movement of x-ray detector 222 and line source 212. Although FIG. 2A depicts second movable platform 226 as a robotic arm positioned over wing 280, other movable platforms are envisioned that include, but are not limited to, a wheeled platform as depicted in FIG. 1, a conveyor belt, a track, a drone, an all wheel crawler, holonic wheels and suction cup wheels FIG. 2A depicts radiographic inspection system 200 having synchronized movement of x-ray generation portion 210 with x-ray detection portion 220 along an axis, for example, a length or long dimension of wing 280. In further aspects, synchronized movement of x-ray generation portion 210 with x-ray detection portion 220 can be around an axis. FIG. 2B illustrates a cross section of, for example, a fuselage 290 of an aircraft. X-ray generation portion 210 is disposed within fuselage 290, for example at an axis of fuselage 290, while x-ray detection portion 220 is disposed outside of fuselage 290. First movable platform 216 positions line source 212 to emit the fan shaped beam of x-rays towards fuselage 290. First movable platform 216 allows rotation of x-ray generation portion 210 so that the fan shaped beam of x-rays can inspect fuselage 290. Rotation of x-ray beam is illustrated in FIG. 2B by a first position 213 of the x-ray beam and a second position 214 of the x-ray beam and dotted curved line 215. Second movable platform 226 positions x-ray detector 222 to detect the fan shaped beam of x-rays after transmission through fuselage 290 and around an outside of fuselage 290 as illustrated by dotted curved line 291. Depending on a width of the fan shaped beam of x-rays, x-ray generation portion 210 and x-ray detection portion 220 may also be moved along the axis to inspect other portions of the fuselage 290.

Figure 3:
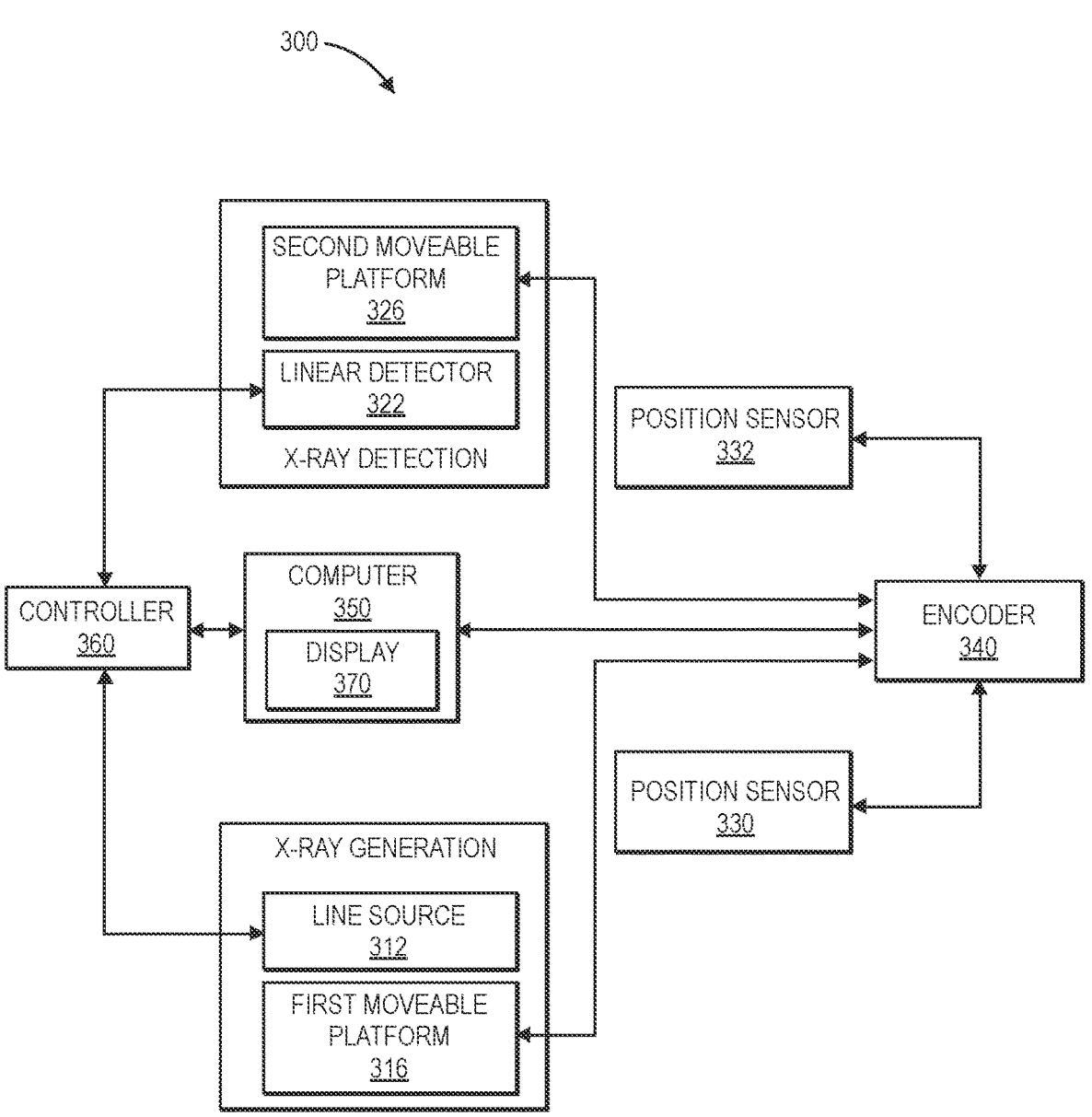
FIG. 3 schematically illustrates a system for radiographic inspection of a structure, according to an implementation.

Referring to FIG. 3, a radiographic inspection system 300 further includes position sensors 330, 332 and an encoder 340 to synchronize movement of the first movable platform and second movable platform. According to the present disclosure, the first movable platform and second movable platform can move at a speed of at least one linear foot per minute. This allows inspection to be completed in less time than conventional transmission radiographic systems. As disclosed herein, line source 312 provides a beam of x-rays having a linear shape resembling a fan and linear x-ray detector 322 includes a one-dimensional x-ray detector having at least one row of x-ray sensitive detectors. As a result, synchronizing movement of first movable platform 316 and second movable platform 326 allows linear x-ray detector 322 to detect the linear shaped x-ray beam after transmission through wing 280 (shown in FIG. 2A). Position sensors 330 and 332 can be, but are not limited to, potentiometric, inductive, capacitive, magnetic, fiber-optic, optical and ultrasonic position sensors. Encoders can be, but are not limited to, magnetic, capacitive, and optical encoders, as well as, photogrammetry, local positioning, and GPS mapping.

Radiographic inspection system 300 further includes a computer 350 and controller 360. Computer is operably coupled to position sensors 330 and 332 through encoder 340, first movable platform 316 and second movable platform 326. Computer 350 includes processors and a memory system including one or more non-transitory computer readable media storing instructions that, when executed, synchronizes movement of first movable platform 316 and second movable platform 326 along a structure being inspected, for example, wing 280. In particular, computer 350, through position sensors 330 and 332, and encoder 340, via processors and software, synchronizes movement of first movable platform 316 and second movable platform 326 along wing 280 so that linear x-ray detector 322 detects the linear shaped x-ray beam after transmission through wing 280. Computer 350 further provides instructions to line source 312 to generate the fan shaped beam of x-rays and receives data from linear x-ray detector 322. Radiographic inspection system 200 can further include a display 370 to show an image of all or a portion of wing 280 and any defects detected by the x-rays. The image shown on display 370 can be real-time image of a structure being inspected and can show the presence and location of FOD on or within the structure being inspected, as well as defects in the structure being inspected. Defects include, but are not limited to, damage resulting from foreign object debris striking the structure being inspected, a crack, delamination, and voids.

Figure 4:
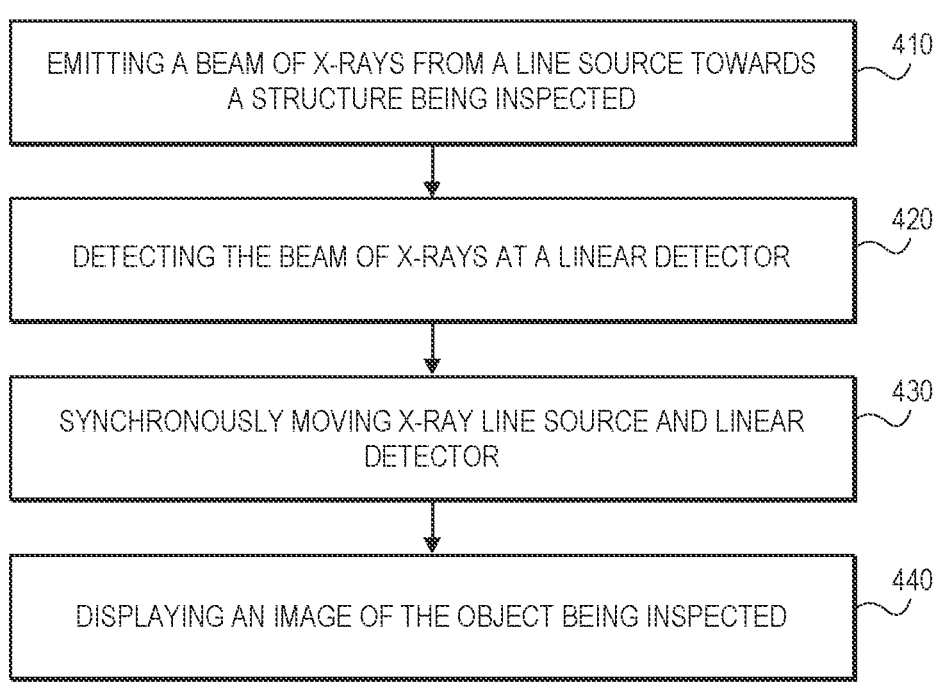
FIG. 4 schematically illustrates a method for radiographic inspection of a structure, according to an implementation.

FIG. 4 depicts an exemplary method for radiographic inspection according to the present disclosure. A radiographic inspection method 400 begins at 410 with a beam of x-rays being emitted by a line source. As disclosed herein, the line source can be mounted on a moveable platform and can emit a two-dimensional, fan-shaped beam of x-rays towards a structure to be inspected. The line source can be positioned on one side of a structure to be inspected, for example, underneath a wing of an aircraft as shown in FIGS. 1 and 2A or inside an aircraft fuselage as shown in FIG. 2B.

While depicted in FIGS. 1 and 2A-2B as an aircraft, one of ordinary skill in the art will understand that the disclosed method is not limited to radiographic inspection of aircraft.

At 420 of radiographic inspection method 400, the beam of x-rays is detected by a linear detector array. The linear detector array can be positioned on the opposite side of the structure to be inspected, for example, on the other side of the wing in FIGS. 1 and 2A or on the other side of the fuselage in FIG. 2B. In this manner, the beam of x-rays can be detected by the linear detector array after the beam of x-rays passes through the structure being inspected.

At 430 of radiographic inspection method 400, the line source and the linear detector array can be synchronously moved along or around an axis, essentially scanning the structure being inspected. For example, the line source and the linear detector array can be synchronously moved along an axis representing a length of a wing of an airplane. In another example, the line source and the linear detector array can be synchronously moved around an axis extending down a length of a fuselage of an aircraft. Synchronous movement can be, for example, at a speed of one linear foot per minute or more. One of ordinary skill in the art will understand that more than one scan may be needed to inspect an entirety of the structure being inspected which can be accomplished by moving one or both of the line source and the linear detector array.

At 440 of radiographic inspection method 400, displaying an image of a portion of the structure being inspected occurs. The image can be a real-time, two-dimensional image of a portion of the structure being inspected. From the image, the type and location of defects such as production defects or damage from use can be identified. As discussed herein, use of a line source provides safety benefits by significantly reducing the amount of x-rays being emitted so evacuation of an area around the structure being inspected may no longer be required. This also allows other tasks such as maintenance or repairs to simultaneously be performed during inspection, saving down time. Furthermore, inspection time can be reduced from days to hours due to the synchronous movement of the line source and linear detector array.

Figure 5:
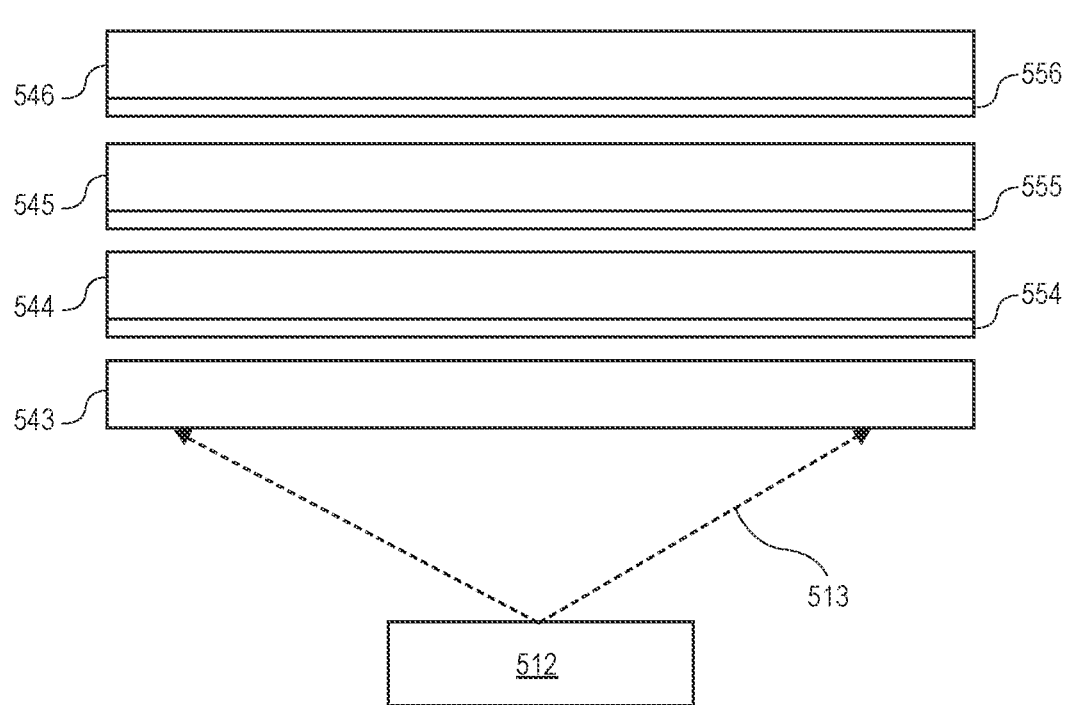
FIG. 5 schematically illustrates a multi-energy linear x-ray detector, according to an implementation.

According to the present disclosure, the linear x-ray detector can further be a multi-energy linear x-ray detector that includes multiple linear x-ray detectors stacked on top of each other and separated by one or more filters that each block x-rays below a certain energy threshold. This configuration allows each of the linear x-ray detectors in the multi-energy linear x-ray detector to detect x-rays having different energy ranges. FIG. 5 schematically depicts a side view of a portion of a multi-energy linear x-ray detector array 542 that includes a first linear x-ray detector 543, a second linear x-ray detector 544, and a third linear x-ray detector 545. First linear x-ray detector 543, second linear x-ray detector 544, and third linear x-ray detector 545 can be stacked atop each other and positioned to detect at least a portion of a fan shaped beam of x-rays 513 (represented by the dotted lines) generated by a line source 512. Each linear x-ray detector can be, for example, a one-dimensional x-ray detector having at least one row of x-ray sensitive detectors. The x-ray sensitive detectors can be, for example, a silicon (Si) or complementary metal-oxide-semiconductor (CMOS) based detector with scintillating materials on top. Scintillating materials can be, for example, CsI:Na, $Gd_2O_2S$, or $CaWO_4$, to convert x-rays to visible light.

A first filter 554 resides between first linear x-ray detector 543 and second linear x-ray detector 544. First filter 554 blocks x-rays below a first energy threshold level from reaching second linear x-ray detector 544. A second filter 555 resides between second linear x-ray detector 544 and third linear x-ray detector 545. Second filter 555 blocks x-rays below a second energy threshold level from reaching third linear x-ray detector 545. The second energy threshold level is higher than the first energy threshold level, so that second x-ray detector 544 only detects x-rays having an energy above the second energy threshold level.

Multi-energy linear x-ray detector array 542 can optionally include additional linear x-ray detectors and additional filters. For example, FIG. 5 further depicts a fourth linear x-ray detector 546 positioned over third linear x-ray detector 545. A third filter 556 resides between third linear x-ray detector 545 and fourth linear x-ray detector 546. Third filter 556 blocks x-rays below a third energy threshold level from reaching fourth linear x-ray detector 546. The third energy threshold level is higher than the second energy threshold level, so that fourth x-ray detector 546 only detects x-rays having and energy above the third energy threshold level.

Filters, for example, first filter 554, second filter 555, and third filter 556, can be formed of any material that blocks x-rays. One of ordinary skill in the art understands that the lower the density of a material, the more transparent the material is to x-rays. Selection of materials for a filter will depend on the materials comprising the structure being inspected. However, the density of the material forming third filter 556 is higher than the density of the material forming second filter 555. And, the density of the material forming second filter 555 is higher than the density of the material forming first filter 554. Examples of materials for the first and second filter include, but are not limited to, hydrocarbon based materials, metal based materials, $H_2O$ based materials, Nitrate based materials, silicone based materials.

In operation, line source 512 produces a fan shaped beam of x-rays 513 that pass through a structure being inspected. First linear x-ray detector 543 detects x-rays 513 having all energies, for example, from about 60 keV to about 220 keV. First filter 554 having a first energy level threshold of, for example, 80 keV passes only x-rays having energies above 80 keV to be detected by second linear x-ray detector 544. Second filter 555 having a second energy level threshold of, for example, 125 keV passes only x-rays having energies above 125 keV to be detected by third linear x-ray detector 545. By selection of materials for first filter 554 and second filter 555, inspection of structures and components formed of multiple types of materials including metals, composites, and plastics can be accomplished to detect FOD based on atomic density, as well as defects or damage of the structure or component being inspected. Results of the inspection can be shown on a display, such as, display 370 depicted in FIG. 3. Display 370 can show all or a portion of the structure being inspected, for example, as a multi-color image where each color represents a range of atomic numbers. By overlaying images produced from data collected by each x-ray detector, the multi-color overlaid image can show defects in different materials having different atomic numbers.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. As used herein, the terms "a", "an", and "the" may refer to one or more elements or parts of elements. As used herein, the terms "first" and "second" may refer to two different elements or parts of elements. As used herein, the term "at least one of A and B" with respect to a listing of items such as, for example, A and B, means A alone, B alone, or A and B. Those skilled in the art will recognize that these and other variations are possible. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the intended purpose described herein. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

Clause 1. A method for inspecting a structure comprising: emitting a beam of x-rays from a line source towards a structure being inspected, wherein the beam of x-rays comprise a fan shape; detecting the beam of x-rays by a linear x-ray detector subsequent to the beam of x-rays passing through the structure being inspected; moving, synchronously, the line source and the linear x-ray detector along the structure being inspected during the emitting the x-ray beam and detecting the x-rays; and displaying a real-time, two-dimensional image of a portion of the structure being inspected.

Clause 2. The method of clause 1, wherein moving, synchronously, the line source and the linear x-ray detector along the structure comprises a speed of one linear foot per minute or more.

Clause 3. The method of clause 1, wherein displaying a real-time, two-dimensional image of a portion of the structure being inspected comprises displaying a defect in a composite portion of the structure being inspected.

Clause 4. The method of clause 1, wherein displaying a real-time, two-dimensional image of a portion of the structure being inspected comprises displaying a defect in a plastic portion of the structure being inspected.

Clause 5. A method for inspecting a structure comprising: emitting a beam of x-rays from a line source towards a structure being inspected, wherein the beam of x-rays comprise a fan shape; detecting the beam of x-rays by a multi-energy linear x-ray detector that includes multiple linear x-ray detectors stacked on top of each other and separated by one or more filters that block x-rays below a certain energy threshold subsequent to the beam of x-rays passing through the structure being inspected; moving, synchronously, the line source and the linear x-ray detector along the structure being inspected during the emitting the x-ray beam and detecting the x-rays.

Clause 6. The method of clause 5 further comprising displaying a real-time, two-dimensional image of at least a portion of the structure being inspected based on the detected x-rays.

Clause 7. The method of clause 5 further comprising identifying a type and location of a defect in the structure being inspected.

Clause 8. The method of clause 5, further comprises blocking x-rays below a first energy threshold using a first filter and blocking x-rays below a second energy threshold using a second filter, wherein the first energy threshold is lower than the second energy threshold.

Clause 9. The method of clause 6, wherein the first energy threshold is 60 keV and the second energy threshold is 80 keV.

Clause 10. The method of clause 5, further comprises blocking x-rays below a third energy threshold, wherein the third energy threshold is 125 keV.

Clause 11. The method of clause 5, wherein displaying a real-time, two-dimensional image of a portion of the structure being inspected comprises displaying a defect in a metal portion of the structure being inspected.

I claim:

1. A system for radiographic inspection of a structure to detect foreign object debris comprising:
a first movable platform;
a line source coupled to the first movable platform, wherein the line source comprises an x-ray tube with a voltage ranging from 30 kV to 450 kV, and wherein the line source emits a fan shaped beam of x-rays;
a second movable platform;
a linear x-ray detector coupled to the second movable platform, wherein the linear x-ray detector is positioned to detect the fan shaped beam of x-rays and is configured to discriminate between atomic numbers of materials to detect the foreign object debris, wherein the linear x-ray detector is a multi-energy linear x-ray detector comprising a plurality of linear x-ray detectors stacked on top of each other and separated by one or more filters;
a position sensor and an encoder to synchronize movement of the first movable platform and second movable platform, and
a display configured to show an image of the structure being inspected,
wherein the image is based on detection, by the linear x-ray detector, of x-rays transmitted through the structure being inspected, and
wherein the image shows whether a structural defect, damage, or debris is present in the structure being inspected.

2. The system of claim 1, wherein the position sensor and the encoder synchronizes movement of the first movable platform and second movable platform along an axis.

3. The system of claim 1, wherein the position sensor and the encoder synchronizes movement of the first movable platform and second movable platform around an axis.

4. The system of claim 1, wherein the first movable platform comprises a robotic arm, or a conveyor belt to move the line source synchronously to movement of the linear x-ray detector.

5. The system of claim 1, wherein the second movable platform comprises a robotic arm, or a conveyor belt to move the linear x-ray detector synchronously to movement of the line source over a surface of a structure under inspection.

6. The system of claim 1, wherein the first movable platform and second movable platform move at a speed of at least one linear foot per minute.

7. The system of claim 1, wherein the display shows a real-time two-dimensional image of a structure being inspected.

8. The system of claim 7, wherein the real-time, two-dimensional images show a presence and a location of a defect in the structure being inspected.

9. The system of claim 7, wherein the real-time, two-dimensional images show foreign object debris on or within the structure being inspected.

10. A system for radiographic inspection of a structure to detect foreign object debris comprising:
a line source that emits a beam of x-rays, wherein the line source comprises an x-ray tube with a voltage ranging from 30 kV to 450 kV;
a first linear x-ray detector;
a second linear x-ray detector positioned over the first linear x-ray detector;
a first filter positioned between the first linear x-ray detector and the second linear x-ray detector, wherein the first filter blocks x-rays below a first energy threshold level;
a third linear x-ray detector positioned over the second linear x-ray detector;
a second filter positioned between the second linear x-ray detector and the third linear x-ray detector, wherein the second filter blocks x-rays below a second energy threshold level, wherein the first, second, and third linear x-ray detectors and the first and second filters are configured to discriminate between atomic numbers of materials to detect the foreign object debris;
a first movable mount that positions the line source to emit the beam of x-rays towards the first, second, and third linear x-ray detectors;
a second movable mount that positions the first, second, and third linear x-ray detectors to detect the beam of x-rays;
a position sensor and an encoder to synchronize movement of the line source and first, second, and third linear x-ray detectors along or around an axis, and
a display configured to show an image of the structure being inspected,
wherein the image is based on detection, by the linear x-ray detector, of x-rays transmitted through the structure being inspected, and
wherein the image shows whether a structural defect, damage, or foreign object debris is present in the structure being inspected.

11. The system of claim 10, wherein the second energy threshold level is higher than the first energy threshold level.

12. The system of claim 10, further comprising:
a fourth linear x-ray detector positioned over the third linear x-ray detector; and
a third filter positioned between the third linear x-ray detector and the fourth linear x-ray detector, wherein the third filter blocks x-rays below a third energy threshold level.

13. The system of claim 12, wherein the third energy threshold level is higher than the second energy threshold level.

14. The system of claim 10, wherein the first filter blocks x-rays below 60 keV.

15. The system of claim 10, wherein the second filter blocks x-rays below 80 keV.

16. The system of claim 10, further including a third filter that blocks x-rays below 125 keV.

17. The system of claim 10, wherein the display shows a real-time two-dimensional image of the structure being inspected.

18. The system of claim 17, wherein the image is the real-time, two-dimensional image of the structure being inspected shows debris on the structure being inspected.

19. The system of claim 17, wherein the real-time, two-dimensional image shows a presence and a location of a crack in the structure being inspected.

20. The system of claim 19, wherein the real-time, two-dimensional images show a defect in one or more of a metal material, a composite material, and a plastic material within the structure being inspected.

\*  \*  \*  \*  \*